US006545417B2

(12) United States Patent
Moon

(10) Patent No.: US 6,545,417 B2
(45) Date of Patent: Apr. 8, 2003

(54) BALLAST SOCKET FOR COMPACT FLUORESCENT LAMP

(76) Inventor: Dai Sung Moon, 105-61 Donga 1-cha, Sindorim-dong Kuroku, Seoul (KR)

( * ) Notice: Subject to any disclaimer, the term of this patent is extended or adjusted under 35 U.S.C. 154(b) by 0 days.

(21) Appl. No.: 09/948,554

(22) Filed: Sep. 10, 2001

(65) Prior Publication Data

US 2003/0011311 A1 Jan. 16, 2003

(30) Foreign Application Priority Data

Jul. 12, 2001 (KR) .......................................... 2001-21194
Aug. 3, 2001 (KR) .......................................... 2001-23593

(51) Int. Cl.[7] .................................................. H01J 7/44
(52) U.S. Cl. .......................................... 315/56; 315/58
(58) Field of Search ............................. 315/56, 58, 55, 315/DIG. 4, 291, 307, 224; 313/634, 318.04, 318.12; 439/226, 236, 602

(56) References Cited

U.S. PATENT DOCUMENTS

| | | | |
|---|---|---|---|
| 4,674,015 A | 6/1987 | Smith | 362/217 |
| 4,947,297 A | 8/1990 | Druffel et al. | 362/147 |
| 5,320,548 A * | 6/1994 | Schadhauser | 313/318.04 |
| 5,455,484 A * | 10/1995 | Maya et al. | 313/318.04 |
| 5,465,196 A | 11/1995 | Hasenberg et al. | 362/183 |
| 5,471,375 A | 11/1995 | Lau | 362/260 |
| 5,477,439 A | 12/1995 | Kowalenko et al. | 362/260 |
| 5,479,075 A | 12/1995 | Chen et al. | 315/283 |
| 5,500,573 A * | 3/1996 | Schulz | 315/362 |
| 5,569,981 A * | 10/1996 | Cho | 315/247 |
| 5,629,586 A * | 5/1997 | Yasuda et al. | 313/318.04 |
| 5,686,799 A * | 11/1997 | Moisin et al. | 313/344 |
| 5,990,628 A * | 11/1999 | Birrell | 315/291 |
| 6,124,684 A * | 9/2000 | Sievers | 250/206 |

OTHER PUBLICATIONS

Kwangho Yoon, A Hybird–Level Multi–Phase Charge–Recycler with Reduced Number of External Capacitors for Low–Power LCD Column Drivers, Aug. 28–30, 2000, AP–ASIC 2000 The Second IEEE Asia Pacific Conference on ASICs.

* cited by examiner

Primary Examiner—Hoanganh Le
Assistant Examiner—Ephrem Alemu
(74) Attorney, Agent, or Firm—Jacobson Holman PLLC

(57) ABSTRACT

A ballast socket for compact fluorescent lamp is disclosed. The ballast socket includes: a case having an upper case, which has a receiving space for receiving a lamp and a connection terminal connected with the lamp at a side of the receiving space, and a lower case, which has a through hole at a lower center of the upper case; a controller mounted in the inside of the case for controlling lighting of the lamp; pins for connecting PCB and the connection terminal; and a printed circuit board on which various circuit components are mounted. The ballast socket is similar with an incandescent lamp socket in outward form but the compact fluorescent lamp not having ballast is used in the ballast socket. Therefore, the ballast socket prevents waste of resources and environmental pollution by saving electricity and improves productivity of the lamp by manufacturing the lamp not having the ballast.

6 Claims, 4 Drawing Sheets

BALLAST SOCKET FOR COMPACT FLUORESCENT LAMP

BACKGROUND OF THE INVENTION

1. Field of the Invention

The present invention relates to a ballast socket for compact fluorescent lamp, and more particularly, to a ballast socket for compact fluorescent lamp capable of using a compact lamp, which does not have a ballast, regardless of a standard by mounting a printed circuit board(hereinafter, referred to as a "PCB"), which has various components, inside the socket.

2. Background of the Related Art

As you know, illuminating means, such as incandescent bulbs and lamps, which emits light and is adhered on the ceiling of an office, a house or a building, serves to light up the surroundings or to make dark according to a user's selection and is replaced with a new one if the life of the illuminating means is up.

A fluorescent lamp is classified into a 20 W lamp and a 40 W lamp and includes a transformer and a ballast.

A compact fluorescent lamp, which is conveniently used, can be used in a socket for a general incandescent lamp because having the ballast on an upper end of the lamp and a screw part.

Presently, a lamp socket for the incandescent lamp and the fluorescent lamp attaching the ballast therein has been widely used for an interior illumination of the house, the office and a company or for the interior illumination of a refrigerator or a microwave oven.

However, because the compact fluorescent lamp has four or two connection pins, the socket fit for the connection pins must be used.

Such conventional lamp is very expensive because the ballast is directly adhered on the lamp and causes waste of resources and environmental pollution because not being used if the life of the ballast is up.

Moreover, a lamp not having the ballast requires the transformer besides the socket or electronic ballast and must be installed in the inside of illuminating means. However, it is difficult to install in the illuminating means due to a bulky transformer or electronic ballast, thereby lowering productivity.

SUMMARY OF THE INVENTION

Accordingly, the present invention is directed to a ballast socket for compact fluorescent lamp that substantially obviates one or more problems due to limitations and disadvantages of the related art.

An object of the present invention is to provide a ballast socket for compact fluorescent lamp capable of enhancing productivity by mounting and manufacturing a printed circuit board, which has various circuit components integrally attached thereon, inside a socket.

Another object of the present invention is to provide a ballast socket for compact fluorescent lamp capable of improving product compatibility by manufacturing the ballast socket to have similar shape and size to a socket for existing incandescent lamp and by making the same possible to be easily installed in an outdoor lamp and an interior lamp including a ceiling lamp, a table lamp, etc.

Further another object of the present invention is to provide a ballast socket for compact fluorescent lamp capable of preventing waste of resources by saving electricity by using a fluorescent lamp consuming electricity smaller than an incandescent lamp.

Still another object of the present invention is to provide a ballast socket for compact fluorescent lamp capable of preventing the environmental pollution.

Yet another object of the present invention is to provide a ballast socket for compact fluorescent lamp capable of improving productivity of the lamp by manufacturing the lamp without adhering ballast on the lamp.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a ballast socket for compact fluorescent lamp includes a case having an upper case, which has a receiving space for receiving a lamp and a connection terminal connected with the lamp at a side of the receiving space, and a lower case, which has a through hole at a lower center of the upper case; a controller mounted in the inside of the case for controlling lighting of the lamp; a printed circuit board(hereinafter, called a "PCB") on which the controller and other components are mounted; and pins for connecting the PCB and the connection terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
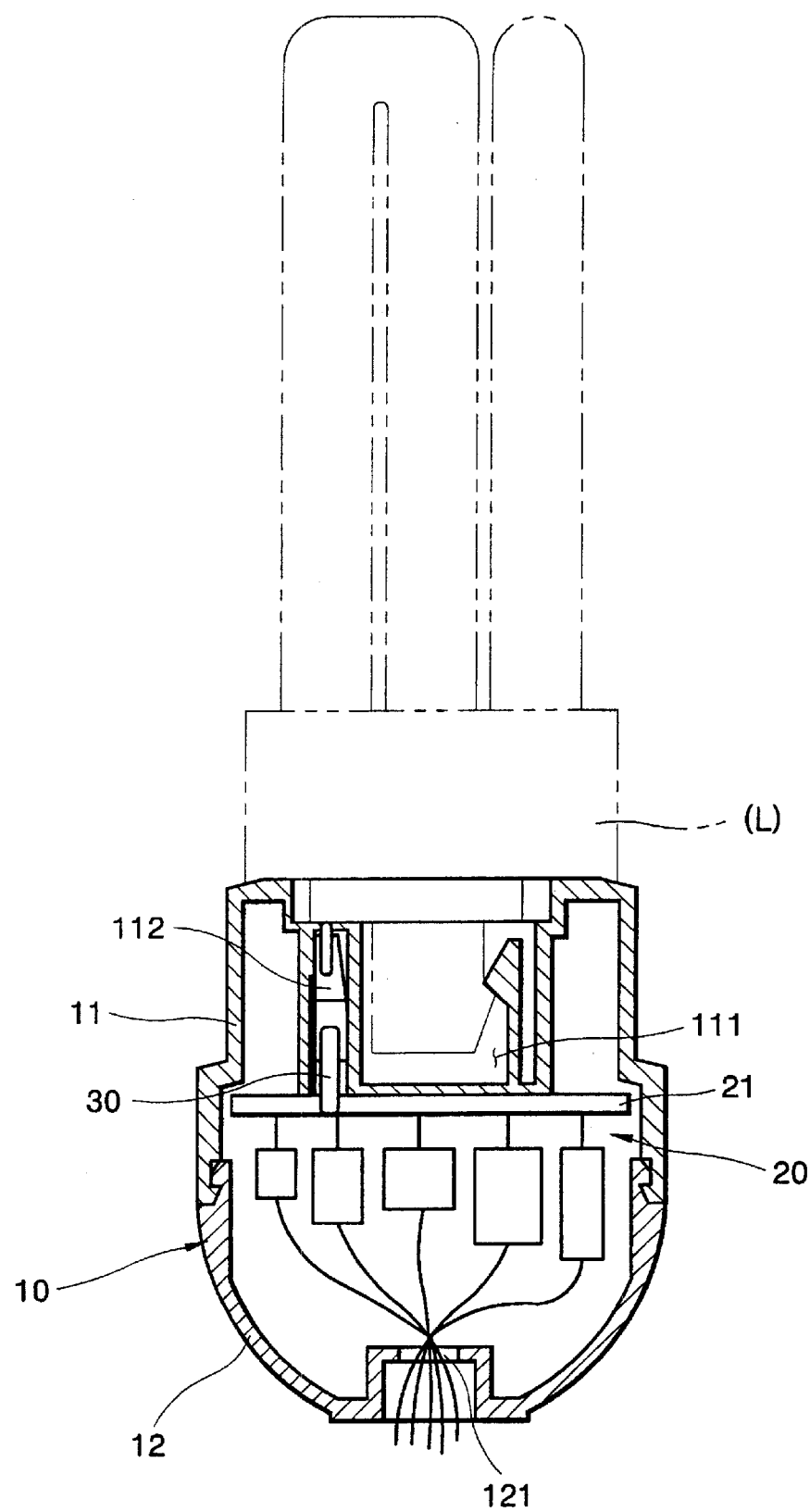
FIG. 1 illustrates a perspective view of a ballast socket applied to the present invention.
Figure 2:
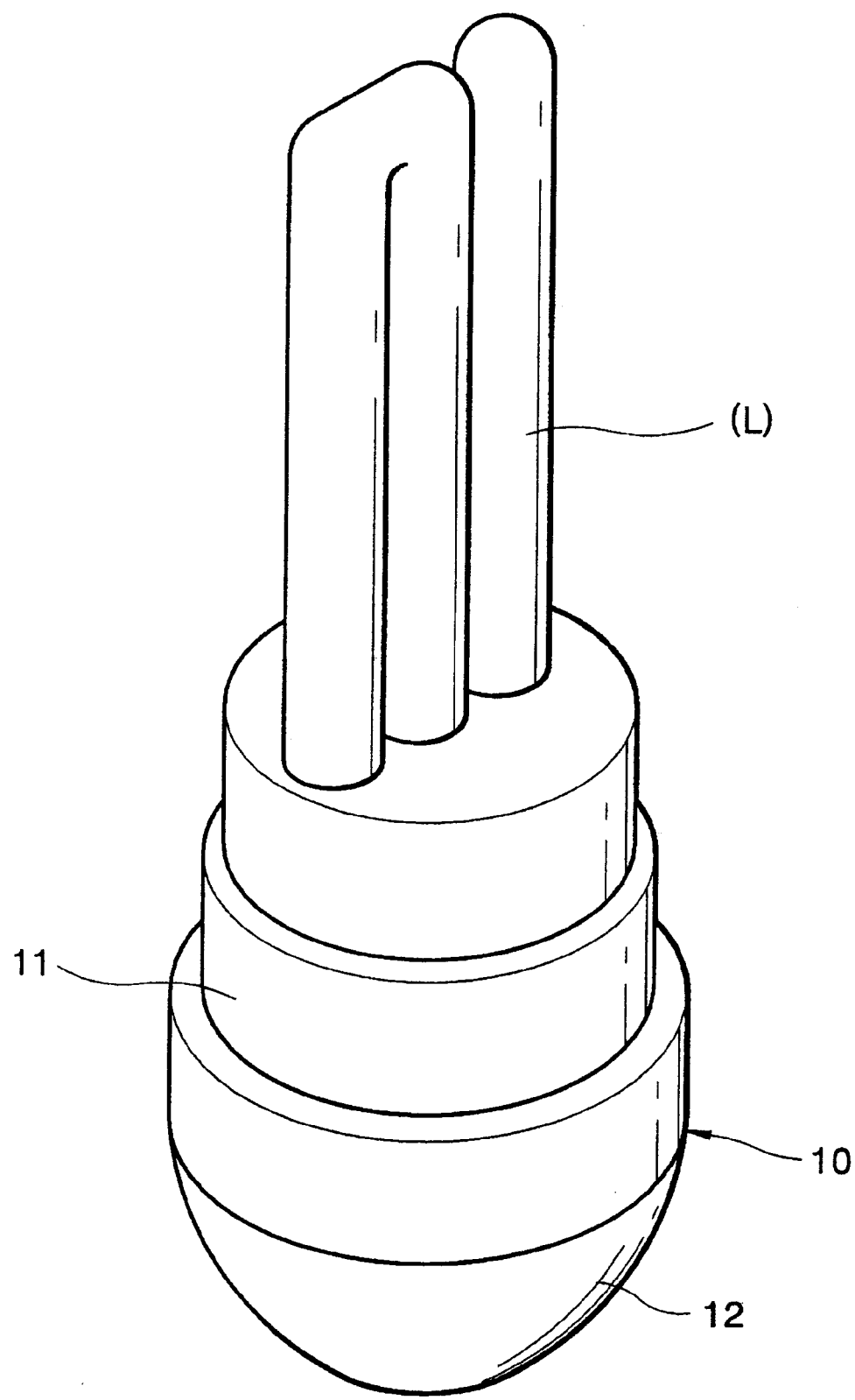
FIG. 2 illustrates a sectional view of the ballast socket.
Figure 3:
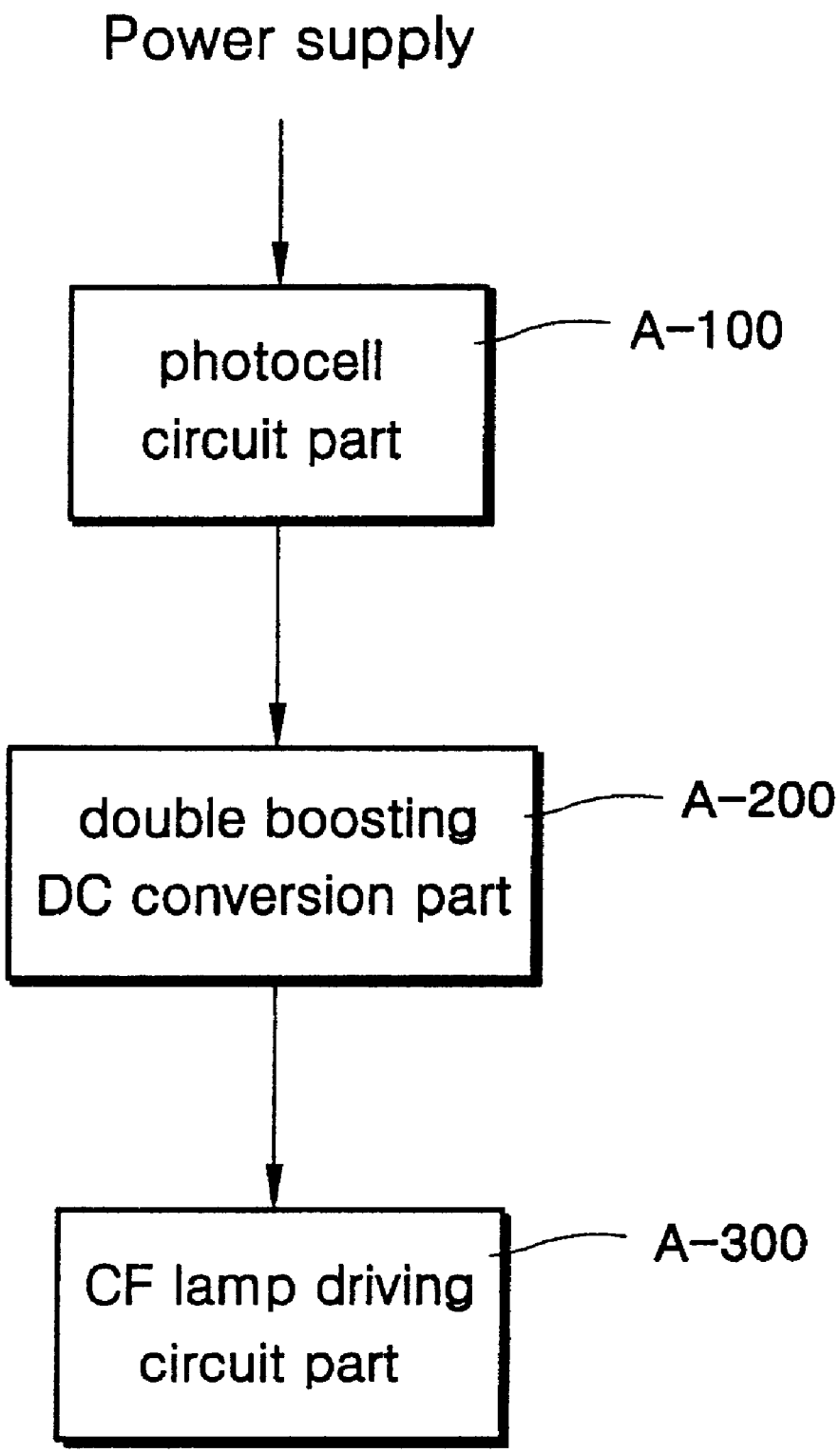
FIG. 3 illustrates a view of an inside structure of the ballast socket.
Figure 4:
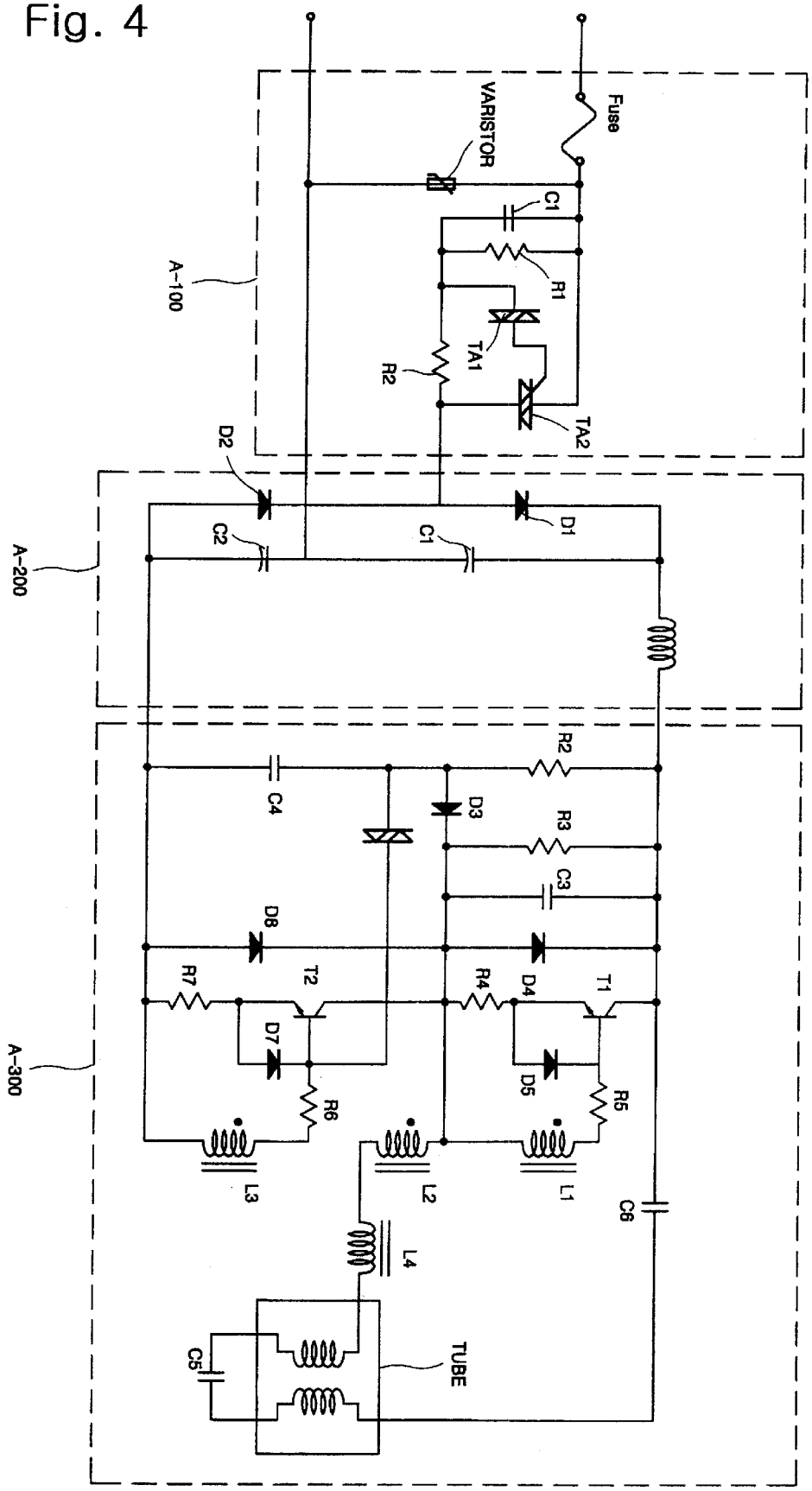
FIG. 4 illustrates a detailed circuit view of the ballast socket.

FIG. 1 illustrates a perspective view of a ballast socket applied to the present invention, FIG. 2 illustrates a sectional view of the ballast socket, FIG. 3 illustrates a view of an inside structure of the ballast socket, and FIG. 4 illustrates a detailed circuit view of the ballast socket.

As shown in FIGS. 1 and 2, the socket according to the present invention includes a case 10 having an upper case 11, which has a receiving space 111 for receiving a lamp and a connection terminal 112 connected with the lamp at a side of the receiving space, and a lower case 12, which has a through hole 121 at a lower center of the upper case 11; a controller 20 mounted in the inside of the case 10 for controlling lighting of the lamp; a printed circuit board (hereinafter, called a "PCB") 21 on which the controller 20 and other components are mounted; and pins 30 for connecting the PCB 21 and the connection terminal 112.

FIG. 3 is a block diagram showing a structure of the controller 20.

The reference numeral A-100 designates a photocell circuit part for supplying an electric power(AC110V or AC220V) to a double boosting DC conversion device A-200 if it is dark around the photocell circuit part or for interrupting the electric power if it is light. The double boosting DC conversion device A-200 receives the electric power according to the control of the photocell circuit part A-100, converts the received electric power into DC electric power and supplies CF lamp driving power to a CF lamp driving circuit part A-300. The CF lamp driving circuit part A-300 receives the CF lamp driving power output from the double boosting DC conversion device A-200 and lights up a CF lamp(L).

The photocell circuit part A-100 includes a photoelectric cell connected to the power source of the socket and having resistance value gradually reduced when exposed in the light and gradually increased in the dark, first and second triacs (TA1 and TA2) connected to the photoelectric cell for supplying or interrupting the electric power to or from diodes (D1, D2) of the double boosting DC conversion device A-200 according to an inner resistance value of the photoelectric cell, and a condenser(C1) connected to the photoelectric cell for storing voltage.

The double boosting DC conversion device A-200 includes the diodes(D1, D2) rectifying AC electric power through a resistance(R1) and the condenser(C1) of the photocell circuit board A-100 and making them into prescribed DC voltage, and electrolytic condensers(C1, C2) connected to the diodes(D1, D2), making DC voltage output from the diodes(D1, D2) smooth and outputting into the DC electric power.

The CF lamp driving circuit part A-300 includes power transistors(T1 and T2) and coils(L1, L2, L3 and L4) connected to the diodes(D1, D2) and the electrolytic condensers (C1, C2) of the double boosting DC conversion device A-200 and making oscillation voltage for lighting up the CF lamp(L), and a tube(TUBE) connected to the coils(L1, L2, L3 and L4) for being provided with high frequency voltage and lighting up the CF lamp(L).

A coupling process of the present invention will be described as follows.

First, the connection terminal 112 is mounted at a side of the receiving space ill of the upper case 11. The PCB 21 having components of the controller 200 for lighting up the lamp(L) is contacted to the other side of the receiving space 111. After that, the pins 30 are inserted into the PCB 21 and connected and fixed to the connection terminal 112.

After that, electric wires for supplying the electric power are connected to the components of the controller 20. The connected electric wires are discharged to the outside through the through hole 121 of the lower case 12. The lower case 12 is pressurized and fixed from the bottom of the upper case 11 to install on the ceiling or a wall surface. At this time, the coupling is finished by inserting and coupling the lamp(L) into the receiving space 111 of the case 10.

The completed socket is similar in shape and size to a socket for incandescent lamp.

An operation process of the present invention will be described as follows.

First, the photocell circuit part A-100 receives common electric power(AC120V or AC220V). The received common electric power determines whether or not the lamp is lit up through the photoelectric cell of the photoelectric circuit part. If the lamp is lit up, AC current is converted into the DC electric power by the diodes(D1, D2) and the electrolytic condensers(C1, C2) of double boosting DC conversion device A-200 and the power transistors(T1 and T2) of the CF lamp driving circuit part A-300 are repeatedly operated, and thereby lighting up the lamp through the coils(L2 and L4).

That is, if it is light around the photocell circuit part A-100, electricity to the double boosting DC conversion device A-200 or the CF lamp driving circuit part A-300 is interrupted not to light up. If it is dark around the photocell circuit part A-100, the photoelectric cell(CDS) turns on the triacs(TA1 and TA2), which is switching elements. Thus, the diodes(D1, D2) of the double boosting DC conversion device A-200 and the triacs(TA1 and TA2) of the CF lamp driving circuit part A-300 are operated and the coils(L1,L2, L3 and L4) are operated, thereby lighting up the lamp.

Here, the triacs(TA1 and TA2) are semiconductor switching elements for maintaining two on-off stable states in a PNPN structure over four layers.

When voltage is applied to a base of the power transistors (T1 and T2) of the CF lamp driving circuit part A-300, the power transistors(T1 and T2) are operated in mutually repeated crossing. Such oscillation voltage provides high oscillation voltage to the CF lamp(L) through the coils(L1, L2, L3 and L4) again.

Here, an appropriate ratio between the power transistors (T1 and T2) and the coils(L1, L2, L3 and L4) is a numerical value for making the PL lamp possible to be used in any type standards.

According to the present invention, the socket is the CF lamp socket, which is provided with voltage of high frequency from the CF lamp driving circuit part and lights up the CF lamp, and can be used in any lamp, e.g., two pin or four pin lamp.

As described above, the present invention can improve productivity by mounting the PCB, on which various components are integrally attached, on an inside of the socket. Further, the present invention can improve product compatibility by making various types of lamps, such as, an outdoor lamp, an interior lamp, etc., possible to be easily installed on the socket for incandescent lamp which has similar shape and size to the ballast socket. Furthermore, the socket can prevent waste of resources by saving electricity by using the fluorescent lamp consuming electricity smaller than the incandescent lamp because being used without regard to standard of the lamp and prevents the environmental pollution. Moreover, the present invention can productivity of the lamp by manufacturing the lamp adhering ballast on the lamp.

The forgoing embodiments are merely exemplary and are not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. A ballast socket for compact fluorescent ("CF") lamp, the ballast socket comprising:

a case having an upper case, which has a receiving space for receiving a lamp and a connection terminal connected with the lamp at a side of the receiving space, and a lower case, which has a through hole at a lower center of the upper case;

a controller mounted in the inside of the case for controlling lighting of the lamp;

a printed circuit board ("PCB") on which the controller and other components are mounted;

pins for connecting the PCB and the connection terminal; and the controller includes
- a photocell circuit part supplying electric power (AC110V or AC220V) to a power supply and DC conversion device if it is dark around the photocell circuit part, the photocell circuit part interrupting an electric power if it is light;
- the power supply and DC conversion device receiving the electric power according to the control of the photocell circuit part, the power supply and DC conversion device converting the received power source into DC power and supplying CF lamp driving power to a CF lamp driving circuit part; and
- the CF lamp driving circuit part receiving the CF lamp driving power output from the power supply and DC conversion device to light up a CF lamp.

2. The ballast socket according to claim 1, wherein the CF lamp is lit up if being fit for the socket of which shapes and sizes are similar to those of common incandescent lamps, without regard to a two-pin lamp or a four-pin lamp.

3. The ballast socket according to claim 1, wherein the photocell circuit part includes:

a photoelectric cell connected to the power source of the socket and having a resistance value gradually reduced when exposed in the light and gradually increased in the dark;

first and second triacs connected to the photoelectric cell for supplying or interrupting the electric power to or from diodes of the power supply and DC conversion device according to an inner resistance value of the photoelectric cell; and a condenser connected to the photoelectric cell for storing voltage.

4. The ballast socket according to claim 1, wherein the power supply and DC conversion device includes:

the diodes rectifying AC electric power through a resistance of the photocell circuit part and the condenser and making the rectified power source into prescribed DC voltage; and electrolytic condensers connected to the diodes, the electrolytic condensers making DC voltage output from the diodes smooth and outputting into DC electric power.

5. The ballast socket according to claim 1, wherein the CF lamp driving circuit part includes:

power transistors and coils connected to the diodes and the electrolytic condensers of the power supply and DC conversion device, the power transistors and the coils making oscillation voltage for lighting up the CF lamp; and a tube connected to the coils for being provided with high frequency voltage and lighting up the CF lamp.

6. The ballast socket according to claim 5, wherein a value of the transistors and a value of the coils are coupled in a ratio and used with a volume of the CF lamp.

* * * * *